April 16, 1957     P. C. BAGLEY ET AL     2,789,032

METHOD FOR SCRUBBING EXHAUST GASES FROM DIESEL ENGINES

Filed June 5, 1953     2 Sheets-Sheet 1

INVENTORS
Paul Campbell Bagley
Thomas Francis McGivney
Henry H. Bruhn
Earl Harold Miller

BY

ATTORNEYS

April 16, 1957 P. C. BAGLEY ET AL 2,789,032
METHOD FOR SCRUBBING EXHAUST GASES FROM DIESEL ENGINES
Filed June 5, 1953 2 Sheets-Sheet 2
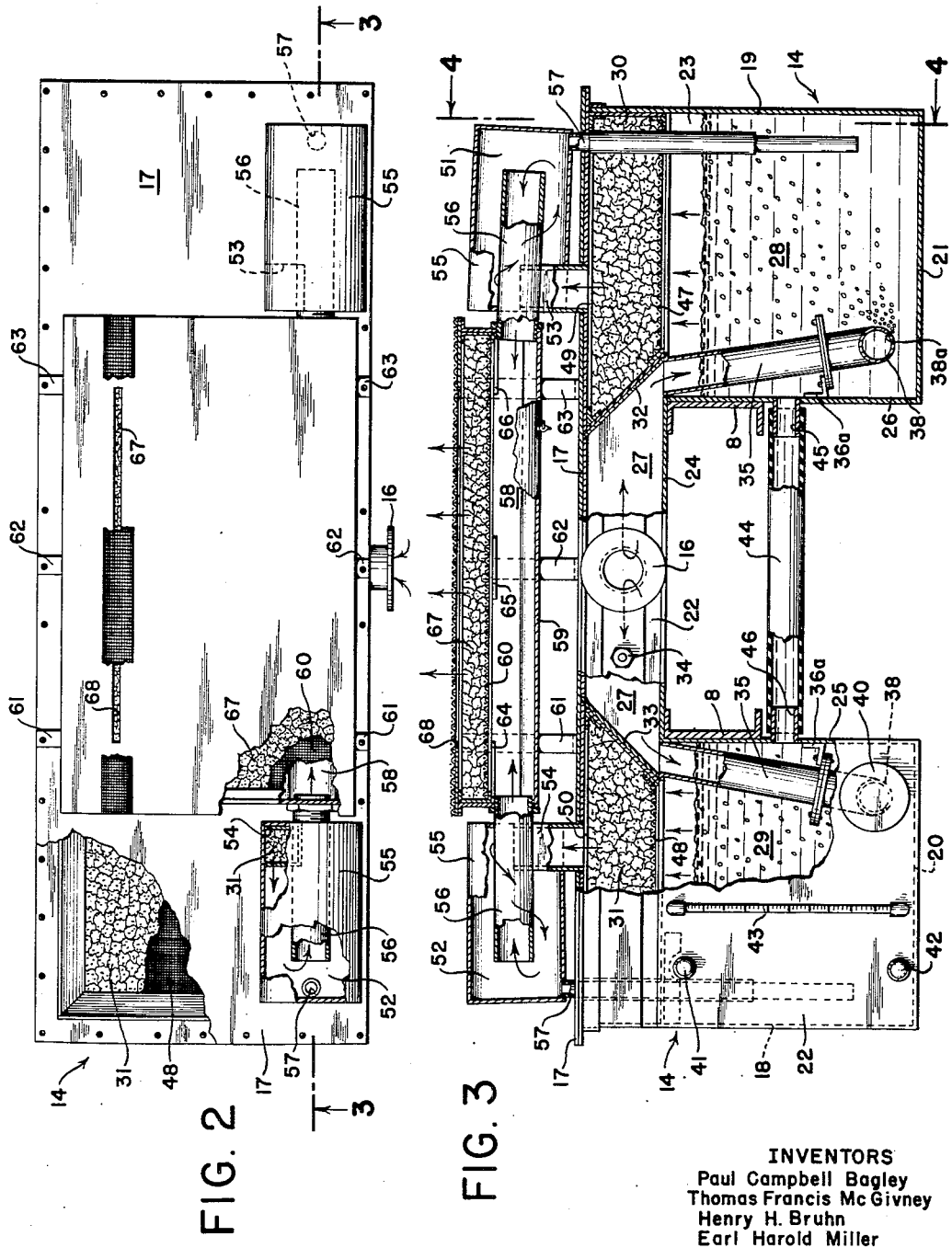
INVENTORS
Paul Campbell Bagley
Thomas Francis McGivney
Henry H. Bruhn
Earl Harold Miller
BY
ATTORNEYS

United States Patent Office 2,789,032
Patented Apr. 16, 1957

2,789,032

METHOD FOR SCRUBBING EXHAUST GASES FROM DIESEL ENGINES

Paul C. Bagley, Thomas F. McGivney, Henry H. Bruhn, and Earl H. Miller, Carlsbad, N. Mex., assignors to United States Borax & Chemical Corporation, a corporation of Nevada Application June 5, 1953, Serial No. 359,816

4 Claims. (Cl. 23—2)

This invention relates to an improved method and apparatus for cooling and scrubbing the exhaust gases from internal combustion engines, and more particularly for treating exhaust gases from diesel engines, such as are used in trucks and tractors operating in underground mines.

The present invention provides an improved method and apparatus for cooling the exhaust gases from diesel engines from a maximum temperature of around 850° F. to an outgoing temperature of less than about 180° F., and also for scrubbing such gases to remove objectionable gases and odors therefrom, so that the cooled and purified exhaust gases can be discharged into the mine air of underground mines without objectionable contamination of the mine air. The improved process and apparatus of the present invention are particularly designed for installation and use on underground mine tractors, where the apparatus is supported by the tractor frame or body without projecting upwardly or laterally beyond the normal width of the tractor and without interfering with the attachment of a trailer to the tractor for underground hauling operations.

In the impoved process and apparatus of the present invention, the hot exhaust gases are first passed into a large equalizing or surge chamber, where the pulsations of the engine are equalized and where the gases may be cooled by expansion, to a limited extent, and they are then passed downwardly and discharged through small openings into large bodies of alkaline water, with resulting turbulence and agitation and intimate contact of the gases and alkaline water to effect rapid cooling and scrubbing of the gases and with continued circulation and turbulence of the large body of alkaline water; the resulting gases, together with more or less of the alkaline water are then passed upwardly through baffle chambers where continued intimate contact of water and gases and further cooling and scrubbing takes place, and entrainment of water by the gases is reduced; and the resulting gases are then passed through cyclone separators to further reduce entrainment and are finally passed through a body of activated carbon to complete the purification of the gases before they are passed into the surrounding air. The intimate contact of the hot gases with the water in the scrubbing tanks and in the baffle compartments results in effective cooling and scrubbing of the gases, while entrainment is minimized by the baffle compartments through which the gases are passed and by the cyclone separators before the gases are finally passed through the activated carbon purifier.

In a large diesel engine such as used in diesel trucks or tractors, a four-cylinder, two-cycle engine may produce as much as 1130 cubic feet per minute of exhaust gases at a temperature around 830° F. These gases require cooling and purification to remove objectionable constituents therefrom, such as aldehydes, oxides of nitrogen which may sometimes be formed, and small quantities, usually minute quantities, of carbon monoxide. The scrubbing of such gases with water causes the water to become acid and quite corrosive in nature, and we have found it advantageous to use alkaline scrubbing water, such as water containing sodium carbonate, to neutralize the acidity and to promote the scrubbing and purifying operation.

The large volume and high temperature of the exhaust gases presents a problem in securing sufficiently intimate contact of the gases with the cooling water and preventing the blowing of water out of the cooling tank or vaporizing too rapidly. We have found that there is a definite relationship between the number of cubic feet of gas exhausted and the number of cubic feet of water in the scrubber tanks.

The improved process and apparatus of the present invention provide for effective cooling and scrubbing and contact of the water and gases, without objectionable loss of scrubbing water by entrainment. We have found it advantageous to provide a large tank of scrubbing water without any internal baffles in the tank, and to introduce the gas through a considerable number of small openings in horizontal pipes located near the bottom of the tank and introduced downwardly at an angle, so that effective agitation and turbulence is effected by the escaping gases. While the gases entering the water effect turbulence and agitation, there is a great deal of splashing and foaming, which tend to carry water along with the gases into the baffle compartment.

We have found it advantageous to have a substantial body of inert pieces of baffling material in the baffle compartment to promote continued intimate contact of gases and water during the passage of the gases through the baffle chambers. Entrainment is greatly reduced by the baffle action in the baffle chambers, but further entrainment is advantageously reduced by providing cyclone separating chambers for separating entrained liquid and returning it to the water tanks. And we have found that the final treatment of the gases with a body of activated carbon is advantageous in giving cool, purified gases suitable for discharging into the surrounding atmosphere.

The material used in the baffle chambers through which the gases pass is advantageously an inert material and particularly a material such as small pieces of broken up aggregates such as broken fragments of concrete building blocks made up with a pumice aggregate, which is very light in weight. The provision of a substantial body of such inert baffling material, through which the gases pass in a tortuous path, not only serves to separate much of the entrained water but to promote cooling and scrubbing of the gases with the water which is carried up into the chamber. And such an inert aggregate also has the advantage of having a strong affinity for tar-like residues in the gases which go through the water bath, so that the pieces of broken concrete block aggregate become coated with substantial amounts of this material. When the baffle material becomes coated with such material, it is removed from time to time and replaced with fresh material. Such inert baffle material does not have any chemical action with the water, but is nevertheless effective in separating entrained water from the gases and in removing tar-like particles from the gases.

The body of activated carbon, through which the gases pass before they are discharged into the atmosphere, is an activated carbon such as the "Columbia" product of the Carbide & Carbon Chemicals Company Grade ACX, 6 to 8 mesh size. A body of such activated carbon serves to adsorb the last traces of objectionable gases or odor which may have passed through the water bath and baffle structure. The use of activated carbon as a final stage of purification of the gases results in the release of an odor-free, safe exhaust discharge from the diesel engine units.

The improved apparatus of the present invention is advantageously a dual type apparatus mounted on the tractor body and extending laterally on both sides of the tractor body, with an overall width which does not exceed the overall width of the tractor, and with the upper portion of the apparatus compactly arranged so that it does not extend upwardly materially above the upper portion of the tractor or of the trailer secured thereto. This compact apparatus advantageously has two separate water scrubbing tanks, one on each side of the tractor body, with separate gas inlet pipes extending downwardly thereto from the equalizing or surge chamber, and with two separate baffle chambers filled with baffling material located above the water tanks for scrubbing the gases coming from the respective tanks. Separate cyclone separators are also advantageously provided, one on each side of the tractor, with one or more bodies of activated carbon, through which the gases pass before they are discharged into the surrounding atmosphere.

By arranging the apparatus in this way, relatively large bodies of water can be provided, which can operate for a considerable time without renewal or replenishing of the water. Water will be continuously removed by vaporization, because of the cooling of the hot gases, and the heat absorbed therefrom. Also, the alkaline solution will gradually accumulate impurities, and the inert scrubbing material will also accumulate tarry impurities. Perodically, the alkaline solution should be drawn out and replenished with sufficient water with added alkali, such as sodium carbonate. And periodically, the scrubbing material should be removed and replaced by fresh material. The activated carbon will also be replaced from time to time with fresh material.

We have found that the depth of water in the water scrubbing chambers should be such as to provide a depth of around 22 inches. This depth does not exert too great a back pressure on the engine exhaust, while giving a desirable time of contact of the gases with the water in their passage through the water tank and the baffle structure above it.

We have thus found it desirable to proportion the various parts of the apparatus so that, for each cubic foot of exhaust gas per minute, there will be approximately 7.46 cubic inches in the surge chamber, about 33.72 cubic inches of water in the water chambers, about 12.08 cubic inches of baffle space, about 5.01 cubic inches of air space above the water, and about 58.67 cubic inches total inside volume of the scrubbing equipment.

The invention will be further described in connection with the accompanying drawings, which illustrate, in a somewhat conventional and diagrammatic manner, an advantageous embodiment of the apparatus of the invention, but it will be understood that the invention is illustrated thereby but is not limited thereto. In the drawings, Fig. 1 is a side view of a diesel truck and trailer having the exhaust scrubbing apparatus of this invention mounted thereon;

Fig. 2 is a plan view of the scrubber apparatus;

Fig. 3 is a front view partially in section substantially along line 3—3 of Fig. 2;

Figure 1:
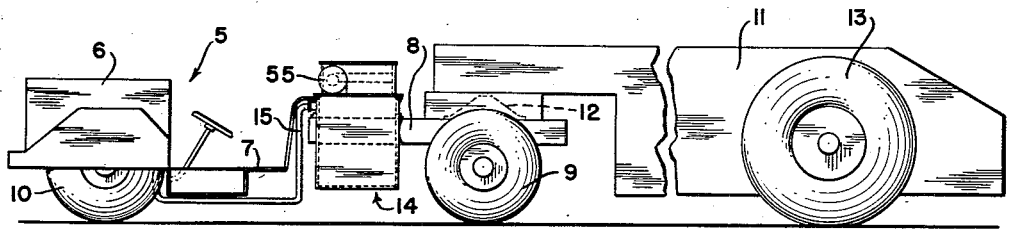

Referring more particularly to Fig. 1, the diesel tractor 5 is of relatively standard design and consists of a diesel engine 6, a driver's seat 7 and a rear platform 8, with wheels 9 and 10.

A standard 15-ton trailer 11 is shown connected with the tractor, and is supported upon the rear platform 8 of the tractor by means of trailer coupling 12. The trailer 11 is further supported by the wheels 13.

The exhaust gas scrubber apparatus 14 of the present invention is compactly mounted on the rear platform 8 of the tractor immediately adjacent to and behind the driver's seat 7. This apparatus 14 is mounted astride the rear platform 8 and does not extend laterally beyond the overall width of the tractor 5.

The exhaust gases from the diesel engine 6 are carried directly to the apparatus 14 by means of conduit 15 which passes under the lower portion of the tractor so that it does not interfere with the operation of the tractor.

Referring to Fig. 3, the apparatus 14 consists of a central housing defined by upper plate 17, side plates 18, 19, 25 and 26, bottom plates 20, 21 and 24, front plate 22 and back plate 23. Upper plate 17 is removably bolted to the side members to provide access to the central housing. Within the central housing, a cut-out rectangular section, defined by plates 24, 25 and 26, is provided to enable the central housing to fit about and be supported by the rear platform 8 of the tractor 5.

Within the housing is provided a surge chamber 27, the dual scrubber tanks 28 and 29, and the dual baffle baskets 30 and 31. The flanged inlet pipe 16 is securely joined to conduit 15 and is located in the center of said plate 22, in direct communication with the surge chamber 27. The urge chamber 27 is defined by upper plate 17, lower plate 24, and side plates 32 and 33, which separate this chamber from the baffle baskets 30 and 31, the top inside plate 17 being welded air tight to side plates 32 and 33, to back plate 23 and to front plate 22. Also provided in forward plate 22 directly communicating with surge chamber 27 is a one-way check valve 34 which, under normal operation, is closed in order that exhaust gases do not leak through. However, should a vacuum develop in surge chamber 27, the valve 34 automatically operates to relieve that pressure so that water from the scrubber tanks 28 and 29 is not drawn back into the engine.

One pair of vertically inclined pipes 35 and 36 lead directly from the surge chamber 27 to the scrubber tank 29. A similar pair of vertical pipes leads from the surge chamber to the similar companion tank 28. Since each pair of vertically inclined pipes is identical, only one set will be described.

Figure 4:
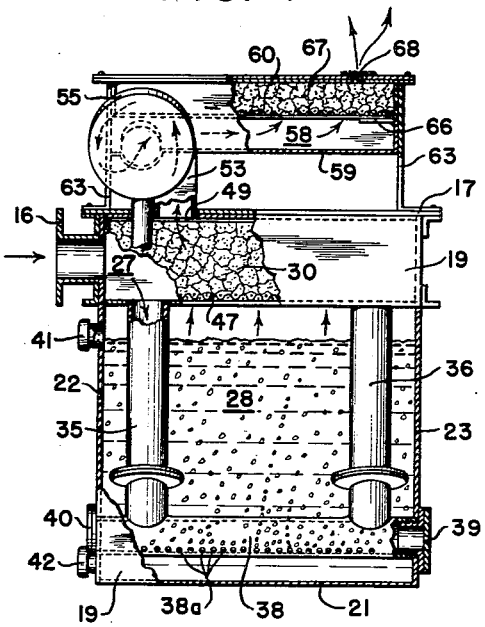
Fig. 4 is a side view partially in section substantially along line 4—4 of Fig. 3.
Figure 5:
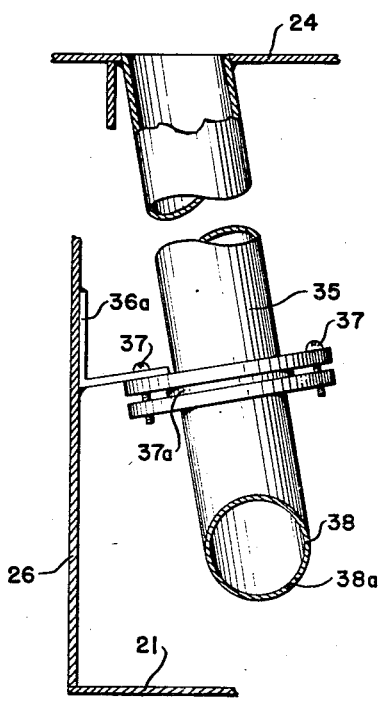
Fig. 5 is a sectional view showing one of the scrubber inlet pipes.

Referring more particularly to Figs. 4 and 5, vertically inclined pipes 35 and 36 are each secured at their upper portion to suitable openings in the surge chamber 27. The lower portion of each pipe is supported in position by a bracket 36a which is fixedly mounted on the side of plate 26 and supports the flanged portion of pipes 35 and 36 by means of threaded screws 37. Pipes 35 and 36 are joined at their flanged portions with lower horizontal pipe 38, the gasket 37a sealing the joint between these pipes. The horizontal pipe 38 extends through front plate 22 and also through back plate 23. The lower portion of pipe 38 contains a plurality of perforations 38a along the lower surface thereof to enable the gases passing therethrough to be evenly dispersed into the scrubber tanks. It is also desirable that pipe 38 be of relatively large diameter. The end portions of horizontal pipe 38 are screw-threaded and closed with caps 39 and 40. By removing caps 39 and 40, a convenient method of cleaning the interior of pipe 38 is provided.

In each scrubber tank, a water inlet 41 is provided at about the water level desired in tank 29, and a water outlet 42 is likewise provided. For convenience in determining the water level, a standard water level gage 43 is also provided on each scrubber tank.

The dual scrubber tanks 28 and 29 are connected immediately below the tractor platform 8 by means of a water equalizer pipe 44. This pipe is fixedly mounted and supported on flanged openings 45 and 46 leading directly to scrubber tanks 28 and 29 respectively and provides for equalizing the water levels in the dual scrubber tanks.

The upper surface of scrubber tanks 28 and 29 are covered by relatively coarse mesh screens 47 and 48 respectively, which define the lower portion of the dual baffle baskets 30 and 31. Baffle baskets 30 and 31 are adapted to contain broken fragments of inert aggregate. The action of this bed of aggregate is to serve as a baffle to promote contact between gases and water carried upwardly and to remove water of entrainment. The upper surface of the baffle baskets 30 and 31 consists of the upper plate 17 which is cut away at 49 and 50 so as to provide an exit for the gases.

Two cyclone separating chambers 51 and 52 are mounted directly above the baffle baskets 30 and 31 respectively. These chambers are connected with the baffle baskets by means of pipes 53 and 54 fixedly mounted in openings 49 and 50 of upper plate 17. The chambers 51 and 52 are identical in construction and consist of a large closed cylindrical casing 55 having a smaller cylindrical pipe 56 axially mounted therein and serving as an exit from said chamber. Drain pipe 57 is provided so as to permit any accumulated and separated water of entrainment to drain back into the scrubbing tank 28. The pipe 57 is conveniently comprised of several telescoped members so that its length may be conveniently adjusted to extend well below the water level of tank 28.

The exit pipe 56 from the chamber 51 is in direct communication with a central chamber 58. This central chamber 58 is mounted directly over the surge chamber 27 and has imperforate lower bottom 59. An upper fine screen 60 covering chamber 58 is supported by means of supporting members 61, 62 and 63. The fine screen 60 is further supported in position by cross members 64, 65 and 66.

Mounted above central chamber 58 and separated from it by the screen 60 is an activated carbon basket 67, which is closed on its side and upper surfaces by plates conveniently welded together and is provided with a narrow slit opening 68 through which the finally purified gases will escape. Slit 68 may advantageously be covered with a screen to prevent the blowing out of carbon from the basket 67.

In the operation of the apparatus described, the water compartments will be filled with water having an alkali such as sodium carbonate therein. The hot exhaust gases from the engine will flow continuously to the surge chamber 27 and will be forced downwardly through each of the two sets of downwardly extending pipes into the horizontal perforated pipes and will be discharged downwardly and outwardly at an angle near the bottom of the large bodies of alkaline water.

The drawings show the gases as broken up into small bubbles, but the rapid rate of gas flow results in gas bubbles of various sizes which are discharged as the gas is discharged at relatively high velocity outwardly into the water. This results in turbulence and agitation of the bodies of water and more or less splashing and foaming and carrying of water along with the gases up into the baffle chambers, where the tortuous passages reduce entrainment but continue intimate contact of the gases with the water carried up into this chamber, with resulting continued cooling and scrubbing of the gases, while the baffle aggregates also serve to hold the tarry material as above described.

From the baffle chambers, the gases pass upwardly through the cyclone separators, where, because of the change of direction and velocity of the gases, entrainment is reduced and the separated entrained liquid is returned to the large bodies of water. The gases then finally pass through the body of activated carbon, where the final purification takes place. The alkali present in the scrubbing water combines with and neutralizes acid constituents scrubbed from the gases, thus preventing an acid condition and resulting corrosion. We have found that a small percentage of sodium carbonate in the water is a desirable alkali for accomplishing this result.

The baffling material such as inert and lightweight concrete aggregate broken into pieces of around 2 to 3 inches in size and held by the relatively coarse screen form an effective entrainment separator and give a desirable scrubbing action between the water carried up into the baffling chambers with the gases and the gases passing upwardly through the baffling material. One type of aggregate that has been found advantageous is one prepared from Portland cement, sand and pumice, broken into pieces of around 2 to 3 inches in size. But other inert scrubbing material can be used which will bring about an intimate contact of the gases with the liquid carried upwardly therewith and which will effectively serve to reduce entrainment by separating the liquid and returning it to the large body of water in the scrubbing tanks.

In the drawings, there is no provision shown for supplying water to make up for evaporation losses. But from time to time the operator of the truck or tractor can stop at a make-up water tank to fill the tanks with additional water in order to maintain a proper level. And at certain intervals, the scrubber tanks are completely emptied, washed out and refilled with a full new batch of alkaline make-up water. Similarly, from time to time, the baffling chambers will have their tar-coated baffling material removed and replaced by fresh material.

It will be evident that the size of the apparatus will vary with engines of different sizes and with the amount of exhaust gas to be passed therethrough. Thus, the scrubber size and shape can be varied with different types of Diesel engines.

It will thus be seen that the present invention provides an improved scrubbing process and apparatus for cooling and purifying exhaust gases from Diesel engines which can be readily mounted on an underground tractor frame without interfering with the use of the tractor in hauling the trailers. The scrubbing apparatus is located between the driver's seat and the rear portion of the tractor which supports the front end of the trailer, and does not interfere with the attachment or removal of the trailer from the tractor.

It will further be seen that the present invention provides not only compact arrangement of apparatus with dual tanks and chambers located on both sides of the tractor and connected for simultaneous and parallel operation, but that the gases are rapidly and effectively cooled and purified, first by intimate contact with the large bodies of alkaline water and the intimate and turbulent contact of the gases therewith; and second, by the further scrubbing of the gases by entrained alkaline water which enters the baffling chambers with the gases, with resulting further purification and cooling of the gases, and with separation of tarry material in the scrubber; third, by removing entrained water by the cyclone separators; and finally by the passage of the gases through the bodies of activated carbon for final purification before they are discharged into the surrounding atmosphere.

The present invention provides an advantageous method and apparatus for the cooling and purification of the exhaust gases from diesel engines used in underground mine operations where it is important to prevent objectionable contamination of the mine air by the exhaust gases.

We claim:

1. The method of cooling and purifying the exhaust gases of Diesel engines comprising the steps of bringing said gases into thorough and intimate contact with a weak alkaline solution in a relatively deep body of water into which the gases are discharged to obtain thorough agitation of the liquid, passing the gases and entrained solution upwardly through a porous bed of chemically inert aggregate to effect further purification thereof, further passing the gases through a bed of activated carbon and then releasing the purified and cooled gases to the atmosphere.

2. The method of cooling and purifying the exhaust gases of Diesel engines comprising the steps of bringing said gases into thorough and intimate contact with a weak alkaline solution in a relatively deep body of water into which the gases are discharged to obtain thorough agitation of the liquid, passing the gases and entrained solution upwardly through a porous bed of chemically inert aggregate to effect further purification thereof, passing the resulting gases through a cyclone separator to reduce entrainment, further passing the gases through a bed of activated carbon and then releasing the purified and cooled gases to the atmosphere.

3. The method of cooling and purifying the exhaust gases of Diesel engines, comprising the steps of passing the gases into an equalizing chamber, passing the gases therefrom into the bottom of a relatively large body of alkaline water and discharging the gases therein downwardly at an angle near the bottom of said body of water, with resulting intimate contact of the gases and water and resulting surging and splashing, passing the resulting gases with entrained water upwardly through a porous bed of chemically inert aggregate to effect further purification thereof, subjecting the gases to a further entrainment separation to remove water therefrom, further passing the gases through a bed of activated carbon, and then releasing the purified and cooled gases to the atmosphere.

4. The method of cooling and purifying the exhaust gases of Diesel engines, comprising the steps of passing said gases into an equalizing chamber, dividing the gases and passing part of the gases through each of two separate bodies of alkaline water and discharging the gases into the water to promote intimate contact and circulation and turbulence of the water, passing the resulting gases and entrained water upwardly from each of said bodies of water through separate porous beds of chemically inert aggregate to effect further purification thereof, subjecting the resulting gases to treatment to effect further the entrainment of water therefrom, passing the resulting gases through a bed of activated carbon and then releasing the purified and cooled gases to the atmosphere.

References Cited in the file of this patent

UNITED STATES PATENTS

| | | |
|---|---|---|
| 1,522,111 | Phillipson | Jan. 6, 1925 |
| 1,772,746 | Cook | Aug. 12, 1930 |
| 2,077,563 | Henry | Apr. 20, 1937 |
| 2,611,680 | Ruth | Sept. 23, 1952 |
| 2,677,601 | Ruth | May 4, 1954 |

FOREIGN PATENTS

| | | |
|---|---|---|
| 74,389 | Austria | June 10, 1918 |